US010072464B2

(12) United States Patent
Do et al.

(10) Patent No.: US 10,072,464 B2
(45) Date of Patent: *Sep. 11, 2018

(54) EARTH-BORING TOOLS INCLUDING FORMATION-ENGAGING STRUCTURES HAVING RETENTION FEATURES AND RELATED METHODS

(71) Applicant: Baker Hughes Incorporated, Houston, TX (US)

(72) Inventors: Do Van Do, The Woodlands, TX (US); Juan Miguel Bilen, The Woodlands, TX (US); Steven C. Russell, Houston, TX (US); Kenneth R. Evans, Spring, TX (US); Jason E. Hoines, Spring, TX (US); Oliver Matthews, Spring, TX (US); R. Keith Glasgow, Willis, TX (US); Chaitanya K. Vempati, Conroe, TX (US)

(73) Assignee: Baker Hughes Incorporated, Houston, TX (US)

( * ) Notice: Subject to any disclaimer, the term of this patent is extended or adjusted under 35 U.S.C. 154(b) by 125 days.

This patent is subject to a terminal disclaimer.

(21) Appl. No.: 15/155,470

(22) Filed: May 16, 2016

(65) Prior Publication Data

US 2016/0258224 A1    Sep. 8, 2016

Related U.S. Application Data

(63) Continuation of application No. 14/272,360, filed on May 7, 2014, now Pat. No. 9,359,826.

(51) Int. Cl.
*E21B 10/00* (2006.01)
*E21B 10/633* (2006.01)
(Continued)

(52) U.S. Cl.
CPC ............ *E21B 10/633* (2013.01); *B23P 15/28* (2013.01); *E21B 10/42* (2013.01); *E21B 10/43* (2013.01);
(Continued)

(58) Field of Classification Search
CPC .............................. E21B 10/627; E21B 10/633
See application file for complete search history.

(56) References Cited

U.S. PATENT DOCUMENTS

| 1,461,554 A | 7/1923 | Raffay |
| 1,902,711 A | 3/1933 | Kulp et al. |

(Continued)

FOREIGN PATENT DOCUMENTS

WO   2012149120 A2   11/2012

OTHER PUBLICATIONS

Nguyen et al., U.S. Appl. No. 14/933,908 entitled Earth-Boring Tools Carrying Formation-Engaging Structures, filed Nov. 5, 2015.

(Continued)

*Primary Examiner* — John J Kreck
(74) *Attorney, Agent, or Firm* — TraskBritt

(57) ABSTRACT

An earth-boring tool includes a formation-engaging structure with a formation-engaging surface at a distal end and a side surface between a proximal end and the distal end along a central axis of the formation-engaging structure. A generally linear recess may be formed in the side surface along an axis oriented at a non-parallel angle relative to the central axis of the formation-engaging structure. A generally helical recess may be formed in the side surface, and the generally helical recess may intersect the generally linear recess. Earth-boring tools may include such formation-engaging structures. Methods may be used to form such formation-engaging structures.

20 Claims, 7 Drawing Sheets

(51) Int. Cl.
  *E21B 10/43* (2006.01)
  *B23P 15/28* (2006.01)
  *E21B 10/42* (2006.01)
  *E21B 10/54* (2006.01)

(52) U.S. Cl.
  CPC ........ *E21B 10/54* (2013.01); *E21B 2010/425* (2013.01); *Y10T 29/49948* (2015.01); *Y10T 29/49964* (2015.01)

(56) References Cited

U.S. PATENT DOCUMENTS

| | | |
|---|---|---|
| 3,148,741 A | 9/1964 | Holsing |
| 3,672,455 A | 6/1972 | Foster |
| 3,693,736 A | 9/1972 | Gardner |
| 3,760,894 A | 9/1973 | Pififer |
| 3,765,496 A | 10/1973 | Flores |
| 3,805,364 A | 4/1974 | Gardner |
| 3,999,620 A | 12/1976 | Watson |
| 4,271,917 A | 6/1981 | Sahley |
| 4,465,148 A | 8/1984 | Morris et al. |
| 4,542,943 A | 9/1985 | Montgomery, Jr. |
| 4,679,858 A | 7/1987 | Tank |
| 4,711,144 A | 12/1987 | Barr et al. |
| 4,838,366 A | 6/1989 | Jones |
| 5,096,344 A | 3/1992 | Fischer |
| 5,333,378 A | 8/1994 | Sjobom |
| 5,560,440 A | 10/1996 | Tibbitts |
| 5,678,645 A | 10/1997 | Tibbitts et al. |
| 5,906,245 A | 5/1999 | Tibbitts et al. |
| 6,142,250 A | 11/2000 | Griffin et al. |
| 6,170,576 B1 | 1/2001 | Brunnert et al. |
| 6,427,791 B1 | 8/2002 | Glowka et al. |
| 6,883,623 B2 | 4/2005 | McCormick et al. |
| 6,920,944 B2 | 7/2005 | Eppink et al. |
| 7,814,997 B2 | 10/2010 | Aliko et al. |
| 7,946,656 B2 | 5/2011 | Hall et al. |
| 8,007,050 B2 | 8/2011 | Hall et al. |
| 8,141,665 B2 | 3/2012 | Ganz |
| 8,172,008 B2 | 5/2012 | Dykstra et al. |
| 9,359,826 B2 * | 6/2016 | Do ........................ E21B 10/633 |
| 9,551,190 B2 | 1/2017 | Hiwasa et al. |
| 2006/0277738 A1 | 12/2006 | Hume et al. |
| 2008/0236900 A1 | 10/2008 | Cooley et al. |
| 2009/0158898 A1 | 6/2009 | Sherwood, Jr. et al. |
| 2010/0276200 A1 | 11/2010 | Schwefe et al. |
| 2010/0314176 A1 | 12/2010 | Zhang et al. |
| 2011/0114393 A1 | 5/2011 | Dolan et al. |
| 2011/0297454 A1 | 12/2011 | Shen et al. |
| 2012/0054998 A1 | 3/2012 | Tschida et al. |
| 2013/0180784 A1 | 7/2013 | Esko et al. |
| 2014/0191563 A1 | 7/2014 | Elfgen |
| 2015/0028656 A1 | 1/2015 | Sollami |
| 2015/0322726 A1 | 11/2015 | Bilen et al. |
| 2015/0322727 A1 | 11/2015 | Do et al. |
| 2015/0330153 A1 | 11/2015 | Miller et al. |

OTHER PUBLICATIONS

PCT International Search Report of the International Searching Authority for PCT/US2015/029597, dated Aug. 21, 2015, 3 pages.
PCT Written Opinion of the International Searching Authority for PCT/US2015/029597, dated Aug. 21, 2015, 9 pages.

* cited by examiner

EARTH-BORING TOOLS INCLUDING FORMATION-ENGAGING STRUCTURES HAVING RETENTION FEATURES AND RELATED METHODS

CROSS-REFERENCE TO RELATED APPLICATION

This application is a continuation of U.S. patent application Ser. No. 14/272,360, filed May 7, 2014, now U.S. Pat. No. 9,359,826, issued Jun. 7, 2016, the disclosure of which is hereby incorporated herein in its entirety by this reference.

TECHNICAL FIELD

Embodiments of the present disclosure relate to formation-engaging structures for earth-boring tools, earth-boring tools including such structures, and related methods.

BACKGROUND

Earth-boring tools are used to form boreholes (e.g., wellbores) in subterranean formations. Such earth-boring tools include, for example, drill bits, reamers, mills, etc. For example, a fixed-cutter earth-boring rotary drill bit (often referred to as a "drag" bit) generally includes a plurality of cutting elements secured to a face of a bit body of the drill bit. The cutters are fixed in place when used to cut formation materials. A conventional fixed-cutter earth-boring rotary drill bit includes a bit body having generally radially projecting and longitudinally extending blades. During drilling operations, the drill bit is positioned at the bottom of a well borehole and rotated.

A plurality of cutting elements is positioned on each of the blades. The cutting elements commonly comprise a "table" of superabrasive material, such as mutually bound particles of polycrystalline diamond, formed on a supporting substrate of a hard material, such as cemented tungsten carbide. Such cutting elements are often referred to as "polycrystalline diamond compact" (PDC) cutting elements or cutters. The plurality of PDC cutting elements may be fixed within cutting element pockets formed in rotationally leading surfaces of each of the blades. Conventionally, a bonding material, such as a braze alloy, may be used to secure the cutting elements to the bit body.

Some earth-boring tools may also include bearing elements that may limit the depth-of-cut (DOC) of the cutting elements, protect the cutting elements from excessive contact with the formation, enhance (e.g., improve) lateral stability of the tool, or perform other functions or combinations of functions. The bearing elements conventionally are located entirely rotationally behind associated leading cutting elements to limit DOC as the bearing elements contact and ride on an underlying earth formation, although bearing elements rotationally leading cutting elements are also known.

BRIEF SUMMARY

In one embodiment of the disclosure, an earth-boring tool includes a body with a receptacle for accepting a formation-engaging structure, a retainer bore accepting a retaining element, the retainer bore extending along a generally linear path through the body of the earth-boring tool and contiguous with a retainer recess intersecting a sidewall of the receptacle. A formation-engaging structure may be disposed within the receptacle of the body of the earth-boring tool. The formation-engaging structure may include a formation-engaging portion disposed at a distal end, a side surface between a proximal end and the distal end along a central axis of the formation-engaging structure, and at least one recess in the side surface. A portion of the retaining element may be adjacent a surface of the formation-engaging structure protruding into the at least one recess and the retainer recess.

In another embodiment of the disclosure, a formation-engaging structure may include a formation-engaging portion at a distal end, a generally cylindrical side surface between a proximal end and the distal end along a central axis of the formation-engaging structure, a generally linear recess in the generally cylindrical side surface extending along an axis oriented with a non-parallel angle relative to the central axis of the formation-engaging structure, and a generally helical recess in the generally cylindrical side surface, the generally helical recess intersecting the generally linear recess.

In yet another embodiment of the disclosure, a method of forming an earth-boring tool may include providing a body with a receptacle for accepting a formation-engaging structure and a retainer bore for accepting a retaining element, the retainer bore extending through the body along a substantially linear path and comprising a retainer recess intersecting a sidewall of the receptacle, inserting a proximal end of a formation-engaging structure into the receptacle with a distal end comprising a formation-engaging portion protruding from the body, and inserting a retaining element into the retainer bore and the retainer recess adjacent a recess in a side surface of the formation-engaging structure.

BRIEF DESCRIPTION OF THE SEVERAL VIEWS OF THE DRAWINGS

While the specification concludes with claims particularly pointing out and distinctly claiming what are regarded as embodiments of the present invention, various features and advantages of disclosed embodiments may be more readily ascertained from the following description when read with reference to the accompanying drawings, in which:

DETAILED DESCRIPTION

The illustrations presented herein are not actual views of any particular material, cutting element, formation-engaging structure, or earth-boring tool, but are merely idealized representations employed to describe embodiments of the present disclosure. Additionally, elements common between figures may retain the same numerical designation.

Figure 1:
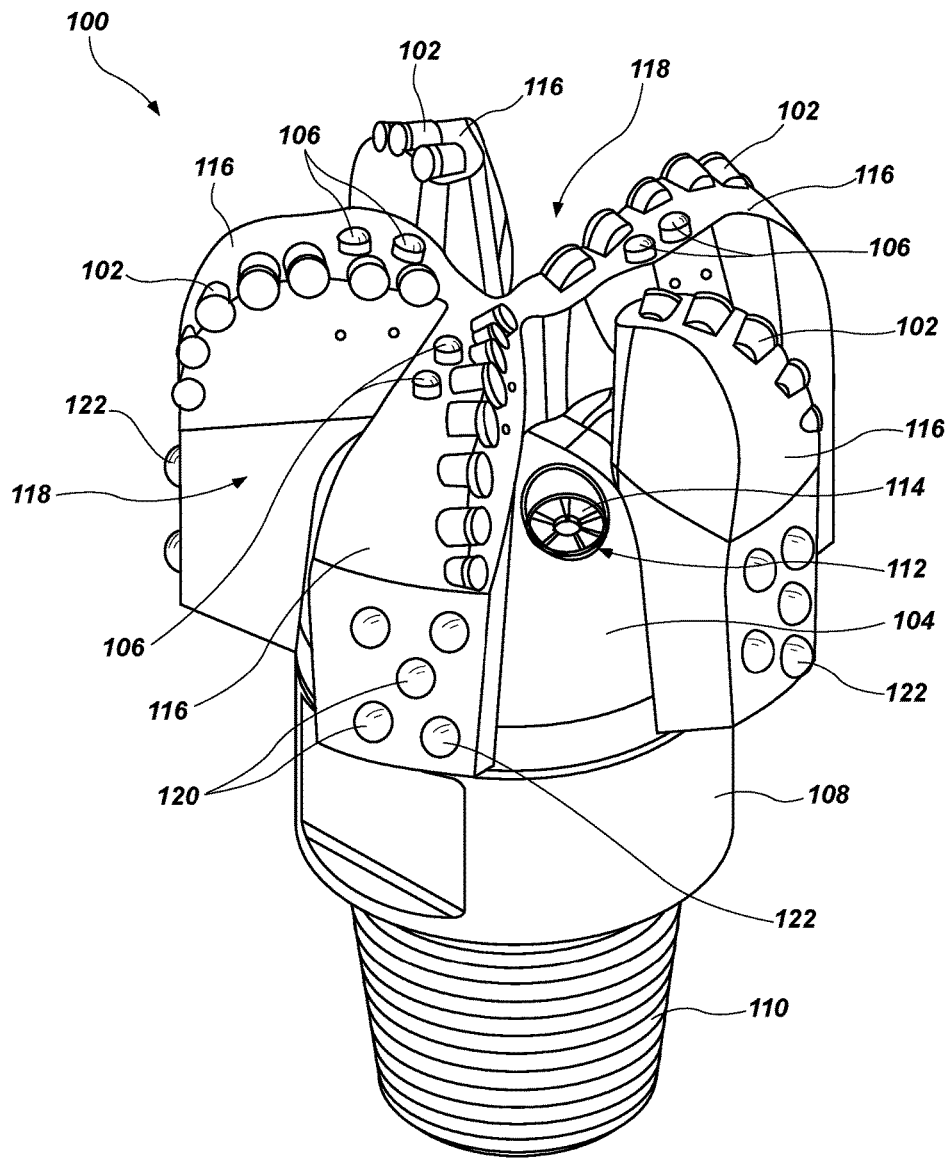
FIG. 1 is a perspective view of an earth-boring drill bit with formation-engaging structures of the disclosure.

FIG. 1 is a perspective view of an embodiment of an earth-boring tool 100 of the present disclosure. The earth-boring tool 100 of FIG. 1 is configured as an earth-boring rotary drill bit. The earth-boring tool 100, more specifically, comprises a drag bit having a plurality of cutting elements 102 affixed to a body 104 of the earth-boring tool 100. The earth-boring tool 100 also includes one or more formation-engaging structures 106 that are attached to the body 104. The formation-engaging structures 106 may comprise, for example, cutting elements, bearing elements, or wear knots. The formation-engaging structures 106 may include features that interact with features of the earth-boring tool 100 to facilitate retention of the formation-engaging structures 106 within the earth-boring tool 100 and removal of the formation-engaging structures 106 from the earth-boring tool 100, as discussed in further detail below.

The body 104 of the earth-boring tool 100 may be secured to a shank 108 having a threaded connection portion 110, which may conform to industry standards, such as those promulgated by the American Petroleum Institute (API), for attaching the earth-boring tool 100 to a drill string (not shown).

The body 104 may include internal fluid passageways that extend between fluid ports 112 at the face of the body 104 and a longitudinal bore that extends through the shank 108 and partially through the body 104. Nozzle inserts 114 may be secured within the fluid ports 112 of the internal fluid passageways. The body 104 may further include a plurality of blades 116 that are separated by fluid courses 118, which may be referred to in the art as "junk slots." In some embodiments, the body 104 may include gage wear plugs 120, wear knots 122, or both.

Each formation-engaging structure 106 may be positioned on a blade 116 to rotationally trail at least one cutting element 102, as shown in FIG. 1. In some embodiments, the formation-engaging structures 106 may be positioned to rotationally lead cutting elements 102 on the same blade 116, or may be disposed at positions intermediate at least two cutting elements 102 along a radial axis. The formation-engaging structures 106 may be formed partially or fully of a wear-resistant material, such as cemented tungsten carbide, or distal ends thereof may comprise a wear-resistant material, such as cemented tungsten carbide or a superabrasive material such as polycrystalline diamond or cubic boron nitride. The wear-resistant material may comprise a coating or particles of the wear-resistant material over an entirety of the distal end, or inserts of the wear-resistant material embedded in a surface of the distal end.

Figure 2:
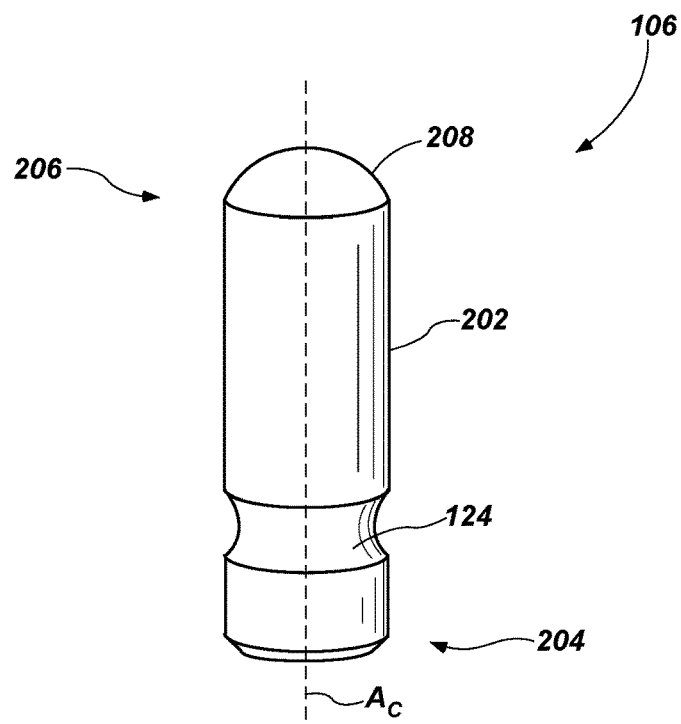
FIG. 2 is a perspective view of a formation-engaging structure of the disclosure.

Referring now to FIG. 2, a formation-engaging structure 106 may include a proximal end 204, a distal end 206, and a formation-engaging surface 208 disposed at the distal end 206. A side surface 202 may be disposed between the proximal end 204 and the distal end 206 and extend along a central axis $A_c$. A cross-sectional shape of the side surface 202 may have a generally curvilinear shape, such as a circle or an ellipse, or may have a generally rectilinear shape, such as a rectangle or another polygon. In some embodiments, the cross-sectional shape of the side surface 202 may include portions with a substantially curvilinear shape and portions with a substantially rectilinear shape. As shown in the embodiment of FIG. 2, the cross-sectional shape of the side surface 202 may be substantially circular, imparting to the side surface 202 a generally cylindrical shape.

The formation-engaging surface 208 may have a substantially convex shape. As a non-limiting example, and as shown in FIG. 2, the formation-engaging surface 208 may have a symmetrical shape, such as a shape substantially comprising at least a portion of a sphere. In some embodiments, the formation-engaging surface 208 may have a substantially hemispherical shape. In other embodiments, the formation-engaging surface 208 may have a substantially asymmetrical shape. In yet other embodiments, the formation-engaging surface 208 may be substantially conical or substantially chisel-shaped. The formation-engaging structure 106 may be referred to in the art as an "ovoid."

The formation-engaging structure 106 may also include a recess 124 in a portion of the side surface 202. As a non-limiting example, the recess 124 may have a substantially arcuate cross-sectional shape, as shown in FIG. 2. In the embodiment shown in FIG. 2, the recess 124 extends annularly around an entire perimeter of the cross-sectional shape of the side surface 202. In other embodiments, the recess 124 may extend through only a portion of the perimeter of the cross-sectional shape of the side surface 202, as described below in connection with FIG. 5.

Figure 3:
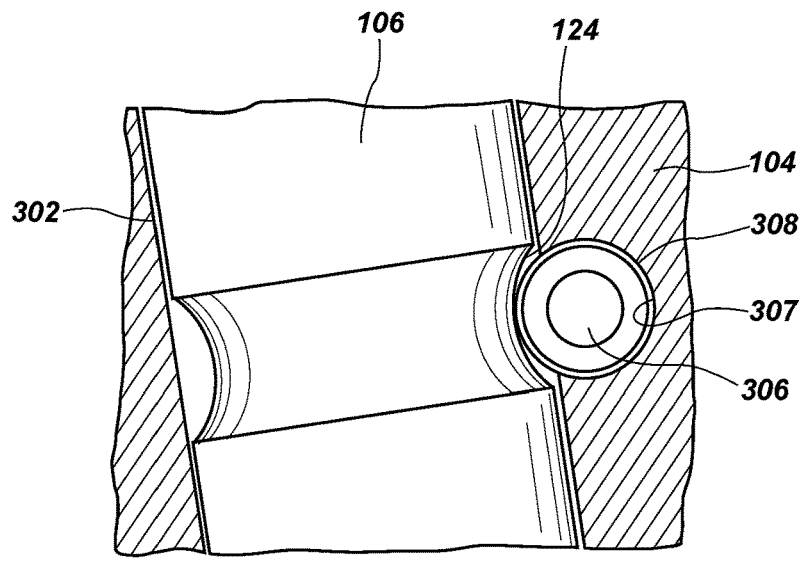
FIG. 3 is a partial cross-sectional view of an earth-boring drill bit and the formation-engaging structure of FIG. 2.

Referring now to FIG. 3, a formation-engaging structure 106 may be disposed within a receptacle 302 of a body 104 of an earth-boring tool 100 (FIG. 1). The receptacle 302 may have a cross-sectional shape substantially similar to the cross-sectional shape of the side surface 202 of the formation-engaging structure 106.

The body 104 of the earth-boring tool 100 (FIG. 1) may include a retainer bore 307 contiguous with a retainer recess 308. The retainer recess 308 may intersect a portion of the receptacle 302. A retaining element 306 may be disposed within the retainer recess 308, and a portion of the retaining element 306 may protrude into the receptacle 302 and abut a portion of the formation-engaging structure 106 within the recess 124. Thus, mechanical interference between the retaining element 306 and a surface of the formation-engaging structure 106 within the recess 124 may be used to retain the formation-engaging structure 106 within the receptacle 302. In the embodiment shown in FIG. 3, the recess 124 formed in the side surface 202 of the formation-engaging structure 106 may be substantially annular, as described above in connection with FIG. 2, and of a radius in transverse cross-section similar or dissimilar to a radius of retainer bore 307 and retainer recess 308. Thus, in the embodiment of FIGS. 2 and 3, the formation-engaging structure 106 may be installed within the receptacle 302 in any rotational orientation about the central axis $A_c$ (FIG. 2).

The receptacle 302 and the retainer bore 307 may be machined or cast into the body 104 of the earth-boring tool 100 (FIG. 1). For example, if the body 104 is formed of a steel alloy, the retainer bore 307 may be drilled into the body 104. In other embodiments, such as embodiments where the body 104 is made from a cemented tungsten carbide matrix material, the retainer bore 307 may be formed in the body 104 during a casting operation. The retainer bore 307 may extend entirely through a portion of the body 104. For example, the retainer bore 307 may extend from one surface of a blade 116 (FIG. 1) of an earth-boring tool 100 to an opposite surface of the blade 116.

Figure 4:
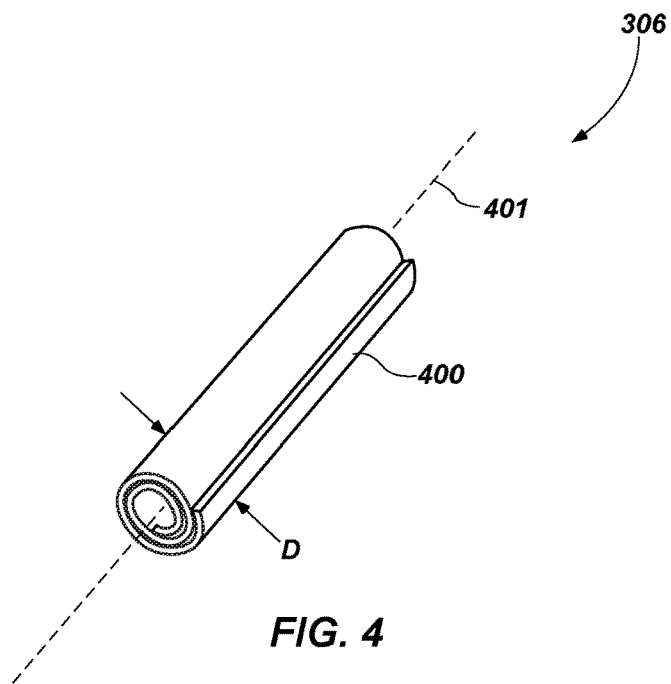
FIG. 4 is a perspective view of a retaining element of the disclosure.

Referring now to FIG. 4, the retaining element 306 may be a formed from a sheet 400 of resilient material rolled about a longitudinal axis 401. As a non-limiting example, the retaining element 306 may comprise, e.g., spring steel. The retaining element 306 may have a diameter D when in an unconfined state. The diameter D may be larger than a diameter of the retainer bore 307 (FIG. 3). Thus, when the retaining element 306, while rolled into a constrained state having a diameter smaller than that of retainer bore 307, is inserted into the retainer bore 307, the roll of material comprising the retaining element 306 when released from its constrained state, elastically expands to a diameter substantially the same as diameter D to enable the retaining element 306 to exert an expansive force against the wall of retainer bore 307 and the surface of recess 124, thus increasing a frictional force between the formation-engaging element 106 (FIG. 3), the retaining element 306 and the retainer bore 307 and securing the retaining element 306 within the retainer bore 307.

The resilient material of the retaining element 306 may enable elastic displacement between the formation-engaging structure 106 and the body 104 of the earth-boring tool 100 (FIG. 1) and may absorb vibration generated during a drilling operation. Elasticity of the retaining element 306 may also enable a retaining element 306 of a single size to conform to multiple retainer bores 307 having slightly different diameters or surface finishes resulting from, e.g., normal manufacturing tolerances.

In other embodiments, a retaining element may be a non-elastic roll pin, or may be machined from a material such as a metal alloy, and may comprise an interference fit with the retainer bore 307.

In some situations, it may be desirable to remove the formation-engaging structure 106 from the receptacle 302 (FIG. 3). For example, the formation-engaging structure 106 may become worn or damaged. Furthermore, it may be desirable to replace the formation-engaging structure 106 with another formation-engaging structure having different characteristics, e.g., shape or exposure, of the formation-engaging surface 208 (FIG. 2).

To remove the formation-engaging structure 106, an operator may remove the retaining element 306 (FIG. 3) by, for example, using a pin punch and hammer to drive the retaining element 306 out of the retainer bore 307. The formation-engaging structure 106 may then be free to remove from the receptacle 302. Another formation-engaging structure 106 may be placed within the receptacle 302, and the retaining element 306 may then be replaced within the retainer bore 307.

Figure 5:
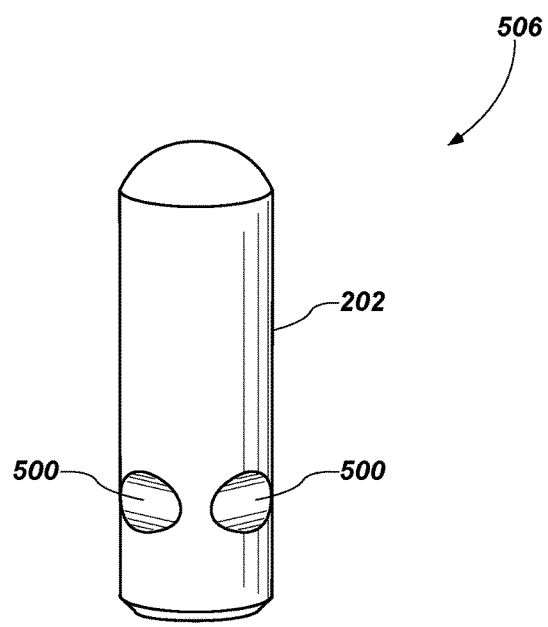
FIG. 5 is a perspective view of a formation-engaging structure of the disclosure.

Referring now to FIG. 5, another embodiment of a formation-engaging structure 506 is shown. The formation-engaging structure 506 includes at least one recess 500 formed in the side surface 202. The at least one recess 500 may extend through only a portion of the periphery of the side surface 202. Thus, the formation-engaging structure 506 may be installed within the receptacle 302 (FIG. 3) only in one or more rotational orientations defined by a position of the at least one recess 500 in the side surface 202 with respect to the central axis $A_c$ (FIG. 2).

In some embodiments, a clearance may exist between the side surface 202 of the formation-engaging structure 106, 506 and a sidewall of the receptacle 302 (FIG. 3). Such a clearance may be provided intentionally, e.g., to facilitate insertion and removal of the formation-engaging structure 106, 506 in the receptacle 302, or may be the product of inaccuracy resulting from normal manufacturing tolerances. During drilling or other operations with the earth-boring tool 100 (FIG. 1), formation cuttings and other drilling debris may pack within the clearance between the sidewall of the receptacle 302 and the side surface 202 (FIG. 2) of the formation-engaging structure 106, 506 and may make it difficult to remove the formation-engaging structure 106, 506 from the receptacle 302. Accordingly, a formation-engaging structure according to another embodiment of the present disclosure may include features to facilitate removal of the formation-engaging structure from the receptacle 302 when drilling debris have become packed within the clearance between the formation-engaging structure and the sidewall of the receptacle 302.

For example, a formation-engaging structure according to the present disclosure may include features configured to interface with a device adapted to apply torque, as described in further detail below in connection with FIG. 6. In some embodiments, a formation engaging-structure may include one or more recesses configured to interact with the retaining element 306 to force the formation-engaging structure from the receptacle 302, as described below in connection with FIGS. 6 through 13.

Figure 6:
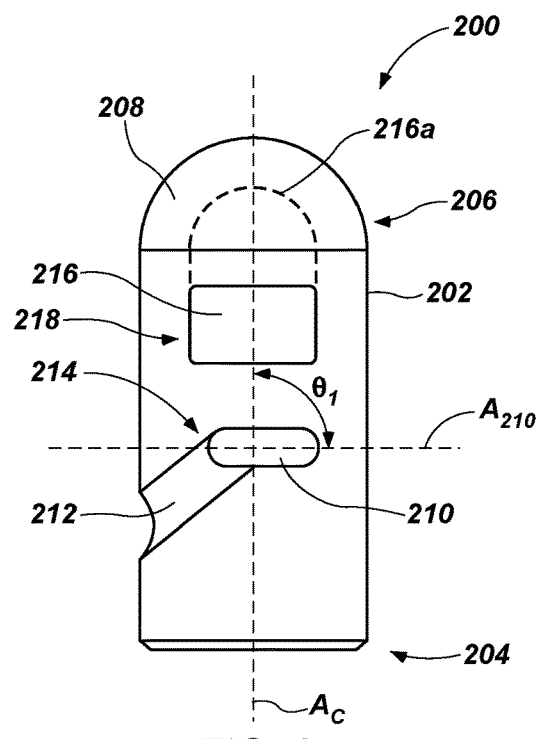
FIG. 6 is a side elevation view of a formation-engaging structure of the disclosure.

Referring now to FIG. 6, a formation-engaging structure 200 may include a side surface 202 between a proximal end 204 and a distal end 206 along a central axis $A_c$. A formation-engaging surface 208 may be disposed at the distal end 206 of the formation-engaging structure 200.

The formation-engaging structure 200 may include at least one recess formed in the side surface 202. For example, in the embodiment of FIG. 6, the formation-engaging structure 200 may include a generally linear recess 210 extending along an axis $A_{210}$ oriented at a non-parallel angle $\theta_1$ with respect to the central axis $A_c$ of the formation-engaging structure 200. As a non-limiting example, the non-parallel angle $\theta_1$ may be between about forty-five degrees (45°) and about one hundred thirty-five degrees (135°). As a further non-limiting example, and as shown in the embodiment of FIG. 6, the non-parallel angle $\theta_1$ may be an angle of about ninety degrees (90°) with respect to the central axis $A_c$.

The generally linear recess 210 may have an arcuate cross-sectional shape in a plane normal to axis $A_{210}$ (i.e., in the embodiment of FIG. 6, a vertically oriented plane extending into and out of the plane of FIG. 6). For example, the generally linear recess 210 may have a cross-sectional shape with a substantially constant radius of curvature. The generally linear recess 210 may extend from the side surface 202 into the formation-engaging structure 200 in a direction normal to the plane of FIG. 6 (i.e., a plane tangent to a point on the side surface 202) a maximum distance less than or substantially equal to the constant radius of curvature. In other embodiments, the generally linear recess 210 may have any suitable cross-sectional shape, such as, without limitation, arcuate shapes, linear shapes, or combinations thereof.

The formation-engaging structure 200 may also include a generally helical recess formed in the side surface 202. For example, a generally helical recess 212 may be formed in the side surface 202 and may extend around a portion of a circumference of the side surface 202. As a non-limiting example, the generally helical recess 212 may extend around less than one hundred eighty degrees (180°) of the circumference of the side surface 202. As a further non-limiting example, the generally helical recess 212 may extend around about ninety degrees (90°) or less of the circumference of the side surface 202.

The generally helical recess 212 may have a substantially constant or a variable pitch. For example, in some embodiments, the helical recess 212 may form an oblique angle of less than ninety degrees (90°) with respect to a plane oriented normal to the central axis $A_c$. As a non-limiting example, the oblique angle may be about forty-five degrees (45°) or less. In other embodiments, the oblique angle may vary along at least a portion of the helical recess 212.

The generally helical recess 212 may comprise an arcuate shape in a cross-sectional plane intersecting the central axis $A_c$. For example, like the cross-sectional shape of the generally linear recess 210, the generally helical recess 212 may have an arcuate cross-sectional shape with a constant radius of curvature. In some embodiments, the radius of curvature of the cross-sectional shape of the generally helical recess 212 may be larger than the radius of curvature of the cross-sectional shape of the generally linear recess 210. In other embodiments, the generally helical recess 212 may have any cross-sectional shape, including arcuate shapes, linear shapes, and combinations thereof.

A portion of the generally linear recess 210 and a portion of the generally helical recess 212 may intersect. For example, as shown in FIG. 6, a proximal end 214 of the generally helical recess 212 may terminate at the generally linear recess 210. In other words, the generally linear recess 210 and the generally helical recess 212 may together form a single recess in the side surface 202, the single recess including a generally linear portion substantially contiguous with a generally helical portion.

The formation-engaging structure 200 may include at least one feature configured to interface with a tool adapted to apply torque. The at least one feature may be formed in a portion of the side surface 202 proximate the distal end 206 of the formation engaging structure 200. For example, the formation-engaging structure 200 may include two planar surfaces 216, which may also be characterized as "flats" (only one planar surface 216 is visible in FIG. 6) comprising the bottoms of slots 218 formed in the side surface 202. In some embodiments, the flats may extend to, and intersect, distal end 206 as shown in broken lines 216a. The planar surfaces 216 and slots 218 may be formed substantially parallel to one another. In the embodiment shown in FIG. 6, the planar surfaces 216 within the slots 218 may be configured to be gripped by a tool such as a wrench, to enable an operator to apply a rotational force to the formation-engaging structure 200. In other embodiments, the at least one feature may be configured to interface with a socket attached to a power tool, such as an impact wrench. It should be understood that any known feature, shape, surface, or configuration thereof that enables the formation-engaging structure 200 to interface with a tool adapted to apply torque is within the scope of the present disclosure.

Figure 7:
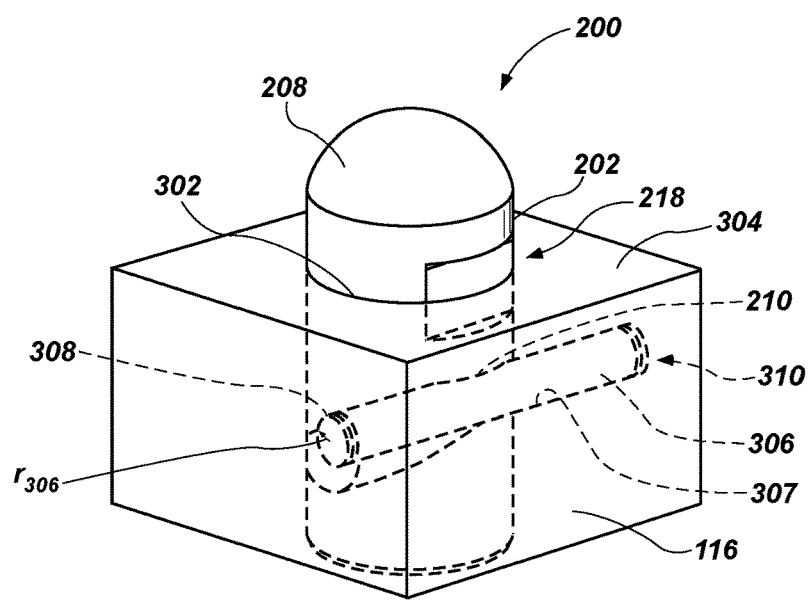
FIG. 7 is a partially hidden perspective view of the formation-engaging structure of FIG. 6 and a retaining element installed in an earth-boring tool.

Referring now to FIG. 7, the formation-engaging structure 200 of FIG. 6 is shown disposed within a receptacle 302 of a portion of an earth-boring tool, such as a blade 116 of the earth-boring tool 100 described in connection with FIG. 1. The receptacle 302 may have an inside diameter substantially equal to the outside diameter of the formation-engaging structure 200. In some embodiments, the inside diameter of the receptacle 302 may be slightly larger than the outside diameter of the formation-engaging structure 200 to provide a small annular clearance, as described above. The formation-engaging surface 208 may protrude from a surface 304 of the blade 116 when the formation-engaging structure 200 is disposed within the receptacle 302. In some embodiments, a portion of the side surface 202 proximate the formation-engaging surface 208 may also protrude from the surface 304. For example, a portion of the side surface 202 including at least a portion of the slots 218 may protrude above the surface 304 of the blade 116.

The earth-boring tool 100 (FIG. 1) may include a retaining element configured to retain the formation-engaging structure 200 within the receptacle 302. For example, a retaining element 306 may be disposed within a retainer bore 307 formed in the blade 116. A retainer recess 308 may be contiguous with the retainer bore 307 extending through blade 116 and partially intersect the receptacle 302, such that when the retaining element 306 is disposed within the retainer recess 308, a portion of the retaining element 306 protrudes into the receptacle 302. In the embodiment shown in FIG. 7, a portion of the retaining element 306 protruding into the receptacle 302 may abut at least a portion of a surface of the formation-engaging structure 200 within the generally linear recess 210 formed in the side surface 202, to retain the formation-engaging structure 200 within receptacle 302.

In some embodiments, the retaining element 306 may have an elongated cylindrical shape, as shown in the embodiment of FIG. 7, with a radius $r_{306}$. The retaining element 306 may be substantially as described above in connection with FIG. 4. In some embodiments, the radius $r_{306}$ may be substantially equal to the radius of curvature of the generally linear recess 210 described above in connection with FIG. 6, such that the portion of the retaining element 306 protruding into the receptacle 302 fits concentrically within the generally linear recess 210 and substantially prevents rotational and translational movement of the formation-engaging structure 200 relative to the blade 116. In other embodiments, the retaining element 306 may have a non-cylindrical shape, and may or may not substantially match the shape of the generally linear recess 210.

The retainer bore 307 may extend completely through the blade 116 to facilitate insertion and removal of the retaining element 306 and the formation-engaging structure 200. For example, the formation-engaging element 200 may be inserted into the receptacle 302 and oriented so that the axis $A_{210}$ (FIG. 6) of the generally linear recess 210 is substantially aligned with a longitudinal axis of the retainer recess 308. The retaining element 306 may be inserted into a first end 310 of the retainer bore 307 and driven into the retainer bore 307 by a hammer and punch, a press, or another suitable tool, until the retaining element 306 is fully disposed within the retainer bore 307 and retains the formation-engaging structure 200 within the receptacle 302. In some embodiments, the retaining element 306 may comprise an interference fit within the retainer bore 307, i.e., the radius $r_{306}$ of the retaining element 306 may be slightly larger than a radius of the retainer bore 307 to provide a tight fit between the retaining element 306 and the retainer bore 307.

In some situations, it may be desirable to remove one or more formation-engaging structures 200 from the earth-boring tool 100 (FIG. 1). For example, the formation engaging-structures 200 may become worn from contact with the formation, or it may be necessary to replace one or more of the formation-engaging structures 200 with formation-engaging structures having different configurations or exposures of the formation-engaging surface 208 (FIG. 6) to alter cutting characteristics of the earth-boring tool 100 (FIG. 1).

Figure 8:
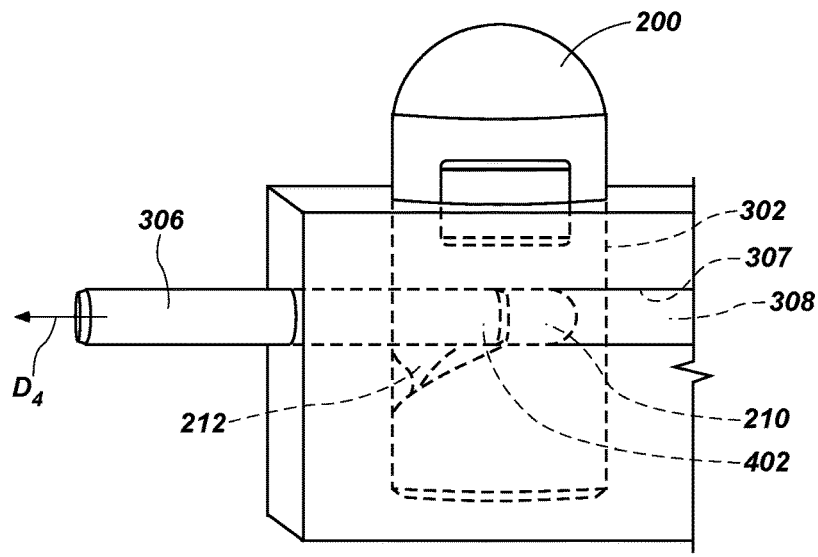
FIG. 8 is a partially hidden perspective view similar to FIG. 7 with the retaining element partially removed from the earth-boring tool.

Accordingly, with reference now to FIG. 8, when it is desired to remove the formation-engaging structure 200 from the receptacle 302, an operator may drive the retaining element 306 in direction $D_4$ to a second position within the retainer bore 307. In this position, the retaining element 306 may clear the surface of the formation-engaging structure 200 within the generally linear recess 210 and allow rotation of the formation-engaging structure 200, and a first end 402 of the retaining element 306 may be disposed within a portion of the generally helical recess 212. In some embodiments, the retaining element 306 may partially protrude from the retainer bore 307 when the retaining element 306 is disposed in the second position. In some embodiments, the operator may use a punch or other tool with a depth indication or limiter to drive the retaining element 306 to the second position. In other embodiments, the retaining element 306 may include a groove or other feature formed in a lateral side of the retaining element 306 to indicate when the retaining element 306 is correctly disposed in the second position.

Figure 9:
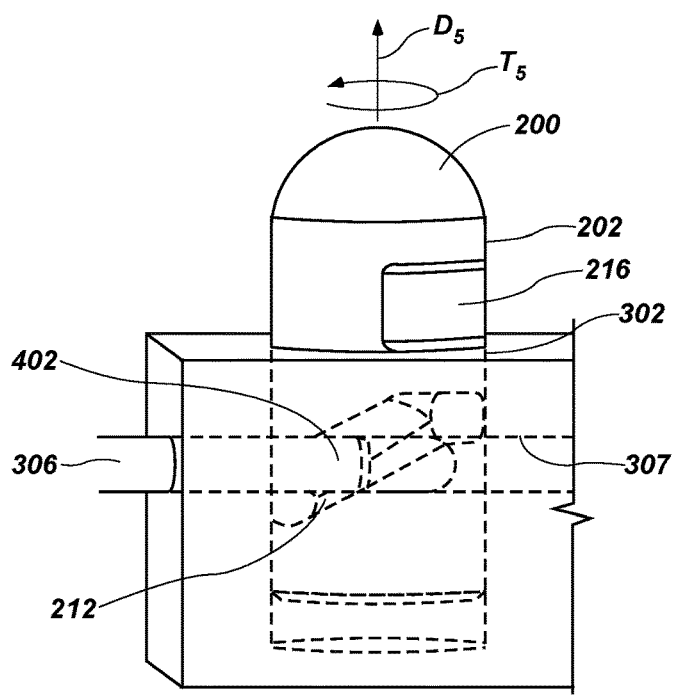
FIG. 9 is a partially hidden perspective view similar to FIG. 8 with the retaining element and the formation-engaging structure partially removed from the earth-boring tool.

Referring now to FIG. 9, an operator may apply a rotational force (i.e., torque) $T_5$ to the formation-engaging structure 200 about the central axis $A_c$ (FIG. 6). For example, the operator may place a tool such as a wrench (not shown) in contact with the at least two substantially planar surfaces 216 (only one planar surface 216 is visible in FIG. 9) formed in the side surface 202 of the formation-engaging structure 200 and apply a rotational force $T_5$ to the wrench handle. As the formation-engaging structure 200 rotates, a surface of the formation-engaging structure 200 within the generally helical recess 212 may bear against the first end 402 of the retaining element 306 and urge the formation-engaging structure 200 in a direction $D_5$ along the central axis $A_c$ (FIG. 6) and outward from the receptacle 302. Resistance created by formation cuttings or other drilling debris packed between the formation-engaging structure 200 and the receptacle 302 may be overcome by the force $T_5$, and the formation-engaging structure 200 may be partially or completely removed from the receptacle 302. The retaining element 306 may then be driven further in direction $D_4$ (FIG. 8) through the retainer bore 307, and the formation-engaging structure 200 may be completely removed from the receptacle 302.

A formation-engaging structure 200 may be reinstalled in the receptacle 302 by inserting the formation-engaging structure 200 in the receptacle 302, aligning the formation-engaging structure 200 so that the axis $A_{210}$ of the generally linear recess 210 (FIG. 6) is aligned substantially parallel with the longitudinal axis of the retainer recess 308, and driving a retaining element 306 into the retainer bore 307, as described above in connection with FIG. 7.

Figure 10:
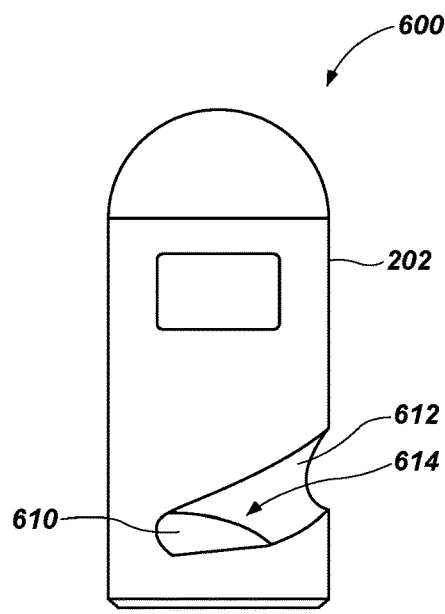
FIG. 10 is a side elevation view of another embodiment of a formation-engaging structure of the disclosure.

Referring now to FIG. 10, another embodiment of a formation-engaging structure 600 according to the disclosure is shown. In this embodiment, a generally linear recess 610 is formed in a side surface 202 of the formation-engaging structure 600. The generally linear recess 610 intersects a generally helical recess 612 formed in the side surface 202 at a distal end 614 of the generally helical recess 612. The generally linear recess 610 and the generally helical recess 612 may include, without limitation, the shapes, characteristics, and orientations described above in connection with the generally linear recess 210 and the generally helical recess 212.

Figure 11:
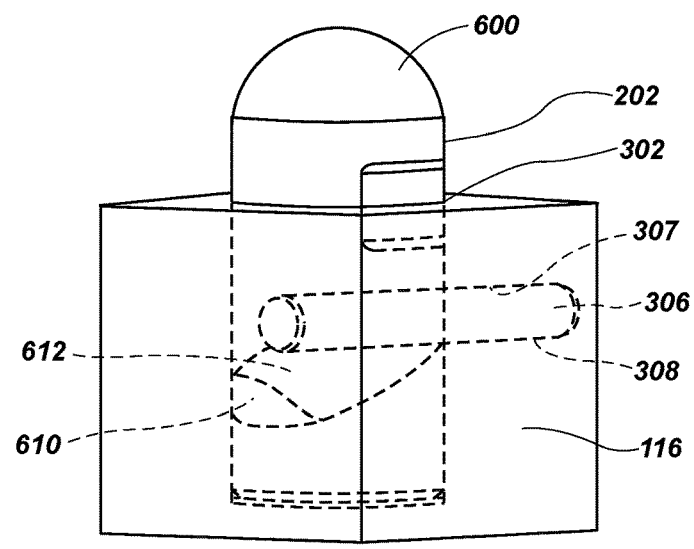
FIG. 11 is a partially hidden perspective view of the formation-engaging structure of FIG. 10 and a retaining element installed in an earth-boring tool.
Figure 12:
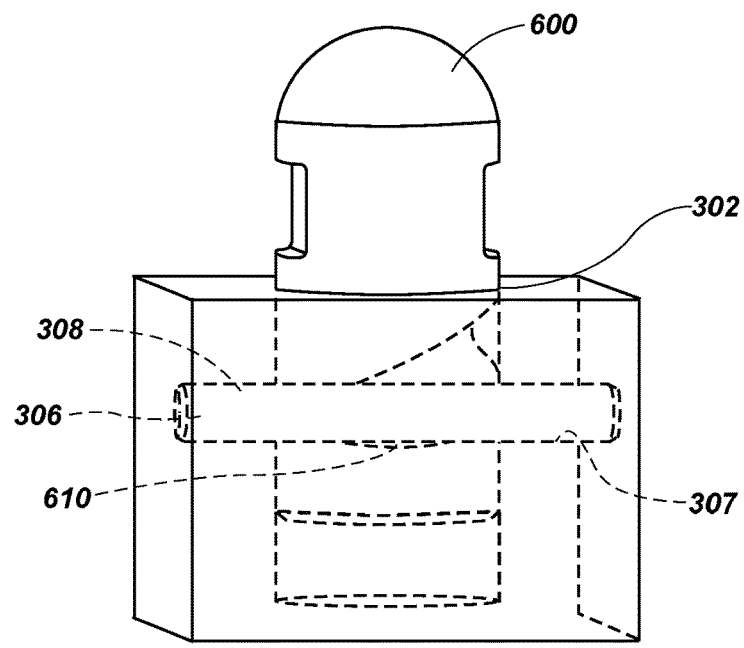
FIG. 12 is a partially hidden perspective view similar to FIG. 11 with the formation-engaging structure partially removed from the earth-boring tool.

Referring now to FIGS. 11 and 12, a formation-engaging structure 600 may be retained in a portion of a body (e.g., a blade 116) of an earth-boring tool 100 (FIG. 1) in the following manner. The formation-engaging structure 600 may be disposed within a receptacle 302 formed in the blade 116 of the earth-boring tool 100, and a retaining element 306 may be disposed within a retainer bore 307 of the blade 116, substantially as described above in connection with FIG. 7. In the embodiment of FIG. 11, a portion of the retaining element 306 may abut a surface of the formation-engaging structure 600 within the generally helical recess 612.

In this embodiment, mechanical interference between the retaining element 306 and a surface of the formation-engaging structure 600 within the generally helical recess 612 may not necessarily preclude rotation of the formation-engaging structure 600 within the receptacle 302. However, friction between the retaining element 306 and the surface of the formation-engaging structure 600 within the generally helical recess 612, as well as friction between the side surface 202 and an interior surface of the blade 116 within the receptacle 302, may substantially prevent rotation of the formation-engaging structure 600 within the receptacle 302 while the earth-boring tool 100 is in use.

Figure 13:
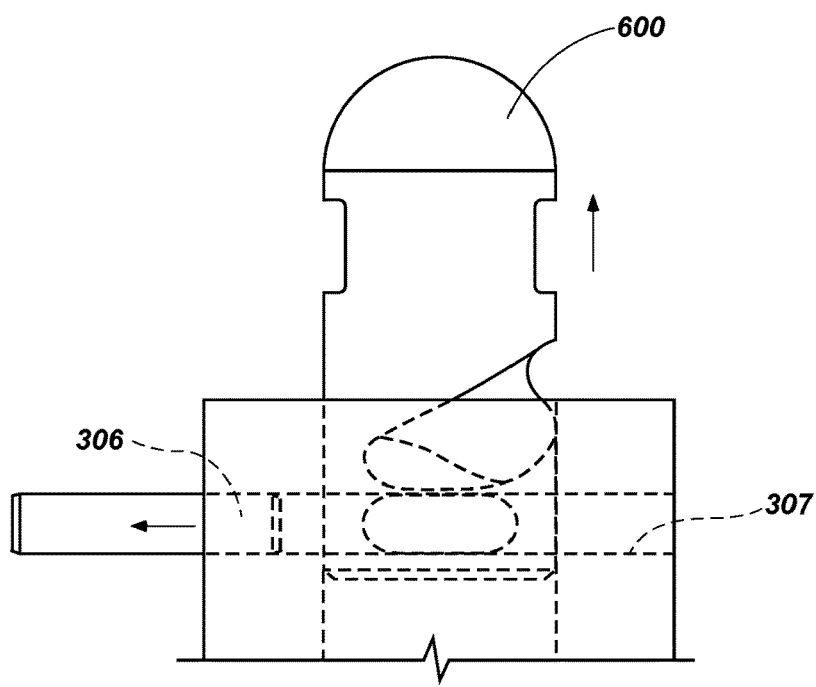
FIG. 13 is a partially hidden perspective view similar to FIG. 12 with the formation-engaging structure and the retaining element partially removed from the earth-boring tool.

As described above, formation cuttings and other debris may pack within a clearance between the side surface 202 of the formation-engaging structure 600 and a surface of the blade 116 within the receptacle 302. When it is desired to remove the formation-engaging structure 600 from the blade 116, an operator may use a wrench or other tool to apply a rotational force to the formation-engaging structure 600 as described above in connection with FIG. 9. In the embodiment of FIGS. 10 through 13, the formation-engaging structure 600 may rotate about, for example, one-quarter (¼) turn (i.e., ninety degrees (90°)) under the applied rotational force while the retaining element 306 remains fully inserted in the retainer bore 307. A surface of the formation-engaging structure 600 within the receptacle 302 may bear against the retaining element 306 as the formation-engaging structure 600 rotates about a central axis (e.g., axis $A_c$ shown in FIG. 6), forcing the formation-engaging structure 600 out of the receptacle 302 in a direction parallel to the central axis $A_c$ until the generally linear recess 610 abuts the retaining element 306 and prevents further rotation of the formation-engaging structure 600, as shown in FIG. 12. As shown in FIG. 13, an operator may then drive the retaining element 306 partially or fully from the retainer bore 307 to enable the formation-engaging structure 600 to be fully removed from the receptacle 302.

Additional non-limiting example embodiments of the disclosure are set forth below.

Embodiment 1

An earth-boring tool, comprising: a body with a receptacle for accepting a formation-engaging structure; a retainer bore accepting a retaining element, the retainer bore extending along a generally linear path through the body of the earth-boring tool and contiguous with a retainer recess intersecting a sidewall of the receptacle; and a formation-engaging structure disposed within the receptacle of the body of the earth-boring tool, the formation-engaging structure comprising: a formation-engaging portion disposed at a distal end; a side surface between a proximal end and the distal end along a central axis of the formation-engaging structure; and at least one recess in the side surface, wherein a portion of the retaining element is adjacent a surface of the formation-engaging structure protruding into the at least one recess and the retainer recess.

Embodiment 2

The earth-boring tool of Embodiment 1, wherein the retaining element is an elongated pin.

Embodiment 3

The earth-boring tool of Embodiment 2, wherein the retaining element comprises a resilient material coiled about a longitudinal axis.

Embodiment 4

The earth-boring tool of any one of Embodiments 1 through 3, wherein the at least one recess in the side surface of the formation-engaging structure comprises an arcuate transverse cross-sectional shape.

Embodiment 5

The earth-boring tool of any one of Embodiments 1 through 4, wherein the formation-engaging structure further comprises at least one feature configured to interface with a tool adapted to apply torque, the at least one feature disposed in at least one of the side surface and the formation-engaging portion.

Embodiment 6

The earth-boring tool of any one of Embodiments 1 through 5, wherein the side surface of the formation-engaging structure is substantially cylindrical, and wherein the at least one recess in the side surface comprises: a generally linear recess in the side surface extending along an axis oriented at a non-parallel angle relative to the central axis of the formation-engaging structure; and a generally helical recess in the side surface, the generally helical recess intersecting the generally linear recess.

Embodiment 7

The earth-boring tool of Embodiment 6, wherein the non-parallel angle is an angle of between about forty-five degrees (45°) and about one hundred thirty-five degrees (135°).

Embodiment 8

The earth-boring tool of Embodiment 7, wherein the non-parallel angle is an angle of about ninety degrees (90°).

Embodiment 9

The earth-boring tool of any one of Embodiments 6 through 8, wherein the generally helical recess extends around about one hundred eighty degrees (180°) or less of a circumference of the formation-engaging structure.

Embodiment 10

The earth-boring tool of Embodiment 9, wherein the generally helical recess extends around about ninety degrees (90°) or less of the circumference of the formation-engaging structure.

Embodiment 11

The earth-boring tool of any one of Embodiments 6 through 10, wherein the generally linear recess intersects the generally helical recess at a distal end of the generally helical recess.

Embodiment 12

The earth-boring tool of any one of Embodiments 6 through 11, wherein the generally linear recess intersects the generally helical recess at a proximal end of the generally helical recess.

Embodiment 13

The earth-boring tool of any one of Embodiments 6 through 12, wherein the generally helical recess comprises an arcuate transverse cross-sectional shape.

Embodiment 14

The earth-boring tool of any one of Embodiments 1 through 13, wherein the earth-boring tool is a fixed-cutter drill bit.

Embodiment 15

A formation-engaging structure, comprising: a formation-engaging portion at a distal end; a generally cylindrical side surface between a proximal end and the distal end along a central axis of the formation-engaging structure; a generally linear recess in the generally cylindrical side surface extending along an axis oriented with a non-parallel angle relative to the central axis of the formation-engaging structure; and a generally helical recess in the generally cylindrical side surface, the generally helical recess intersecting the generally linear recess.

Embodiment 16

The formation-engaging structure of Embodiment 15, wherein the generally linear recess comprises a cross-sectional shape with a constant radius of curvature.

Embodiment 17

The formation-engaging structure of Embodiment 16, wherein the generally helical recess comprises a cross-sectional shape with a constant radius of curvature greater than the radius of curvature of the cross-sectional shape of the generally linear recess.

Embodiment 18

A method of forming an earth-boring tool, comprising: providing a body with a receptacle for accepting a formation-engaging structure and a retainer bore for accepting a retaining element, the retainer bore extending through the body along a substantially linear path and comprising a retainer recess intersecting a sidewall of the receptacle; inserting a proximal end of a formation-engaging structure into the receptacle with a distal end comprising a formation-engaging portion protruding from the body; and inserting a retaining element into the retainer bore and the retainer recess adjacent a recess in a side surface of the formation-engaging structure.

Embodiment 19

The method of Embodiment 18, wherein inserting a proximal end of a formation-engaging structure into the receptacle comprises inserting a proximal end of a formation-engaging structure having a generally helical recess in the side surface and a generally linear recess in the side surface in intersecting relationship and inserting the retaining element adjacent a portion of the generally linear recess.

Embodiment 20

The method of Embodiment 19, wherein inserting a proximal end of a formation-engaging structure having a generally helical recess in the side surface and a generally linear recess in the side surface in intersecting relationship comprises inserting a proximal end of a formation-engaging structure wherein at least one of the generally helical recess and the generally linear recess have a substantially arcuate transverse cross-sectional shape.

Although the foregoing description contains many specifics, these are not to be construed as limiting the scope of the present invention, but merely as providing certain exemplary embodiments. Similarly, other embodiments of the invention may be devised that do not depart from the spirit or scope of the present disclosure. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the disclosed embodiments, which fall within the meaning and scope of the claims, are encompassed by the present disclosure.

What is claimed is:

1. A method of forming an earth-boring tool, comprising:
providing a tool body with a receptacle for accepting a formation-engaging structure and a retainer bore for accepting a retaining element, the retainer bore extending through the tool body along a substantially linear path and comprising a retainer recess intersecting a sidewall of the receptacle;
forming a helical recess and a linear recess in intersecting relationship in a side surface of the formation-engaging structure, the linear recess extending along an axis oriented at a non-parallel angle relative to a central axis of the formation-engaging structure;
inserting the formation-engaging structure in the receptacle; and
inserting the retaining element into the retainer bore and the retainer recess adjacent a portion of the linear recess in the side surface of the formation-engaging structure.

2. The method of claim 1, wherein forming the helical recess and the linear recess in intersecting relationship comprises forming the helical recess to intersect the linear recess at a proximal end of the helical recess.

3. The method of claim 1, wherein forming the helical recess and the linear recess in intersecting relationship comprises forming the linear recess to intersect the helical recess at a distal end of the helical recess.

4. The method of claim 1, wherein forming the helical recess and the linear recess in intersecting relationship comprises forming the helical recess at an oblique angle with a plane oriented normal to the central axis of the formation engaging structure.

5. The method of claim 1, wherein forming the helical recess and the linear recess comprises forming the helical recess and the linear recess to have a substantially arcuate cross-sectional shape.

6. The method of claim 5, wherein forming the helical recess and the linear recess to have a substantially arcuate cross-sectional shape comprises forming the linear recess to comprise a first radius of curvature less than a second radius of curvature of the helical recess.

7. The method of claim 1, further comprising forming at least one planar surface in the side surface configured to interface with a tool adapted to apply torque to the formation-engaging structure.

8. An earth-boring tool, comprising:
a tool body comprising a receptacle and a retainer bore, the retainer bore extending along a generally linear path through the tool body and contiguous with a retainer recess intersecting a sidewall of the receptacle;
a formation-engaging structure disposed in the receptacle, the formation-engaging structure comprising:
a side surface extending along a central axis of the formation-engaging structure between a proximal end and a distal end; and
a recess in the side surface comprising:
a generally linear portion extending along an axis oriented at a non-parallel angle relative to the central axis of the formation-engaging structure; and
a generally helical portion in intersecting relation with the generally linear portion;
a retaining element disposed in the retainer bore; and
wherein a portion of the retaining element is adjacent a surface of the formation-engaging structure protruding into the recess and adjacent the retainer recess.

9. The earth-boring tool of claim 8, wherein the recess in the side surface of the formation-engaging structure is located and configured such that rotation of the formation-engaging structure within the receptacle about the central axis of the formation-engaging structure causes the recess to bear against the retaining element and the formation-engaging structure to move in a direction along the central axis of the formation-engaging structure relative to the receptacle of the body.

10. The earth-boring tool of claim 8, wherein the generally helical portion of the recess forms an oblique angle with a plane oriented normal to the central axis of the formation engaging structure.

11. The earth-boring tool of claim 10, wherein the oblique angle is less than 90 degrees.

12. The earth-boring tool of claim 11, wherein the oblique angle is less than 45 degrees.

13. The earth-boring tool of claim 10, wherein the oblique angle varies along a portion of the generally helical portion of the recess.

14. The earth-boring tool of claim 8, wherein the recess extends around about 180 degrees or less of a periphery of the side surface.

15. The earth-boring tool of claim 14, wherein the recess extends around about 90 degrees or less of the periphery of the side surface.

16. The earth-boring tool of claim 8, wherein the formation-engaging structure comprises a wear-resistant material.

17. The earth-boring tool of claim 8, wherein mechanical interference between the retaining element and the formation-engaging structure retains the formation-engaging structure within the receptacle.

18. A method of removing a formation-engaging structure from a receptacle in a body of an earth-boring tool, comprising:
removing a retaining element from a linear recess in a side surface of the formation-engaging structure;
applying a rotational force to the formation-engaging structure about a central axis thereof; and bearing a surface of the formation-engaging structure within a helical recess in the side surface of the formation-engaging structure against the retaining element forcing the formation-engaging structure in a direction parallel to the central axis thereof.

19. The method of claim 18, further comprising:

removing the retaining element from the helical recess in the side surface of the formation-engaging structure; and removing the formation-engaging structure from the receptacle.

20. The method of claim 18, wherein removing the retaining element from the linear recess comprises driving the retaining element out of the linear recess using at least one of a pin punch or hammer.

* * * * *